March 7, 1950  R. MESTAS  2,499,665
ELECTRIC GAUGE HEAD
Original Filed Aug. 3, 1940
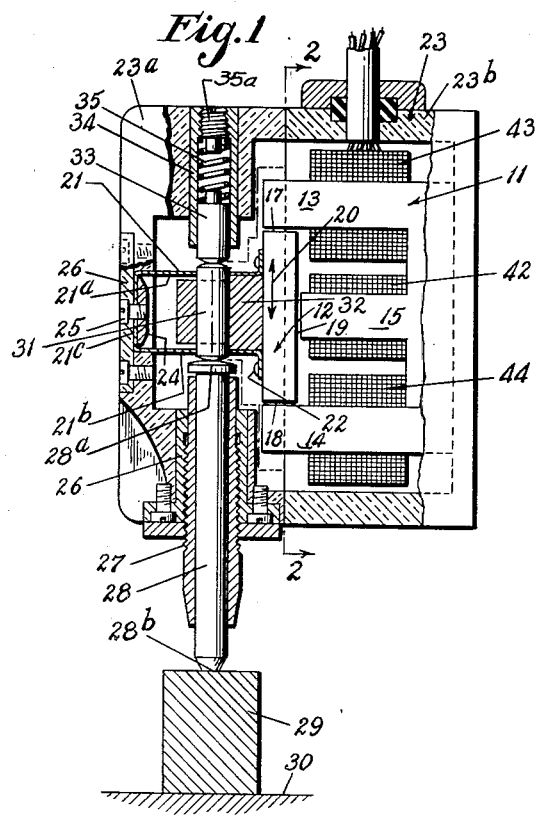
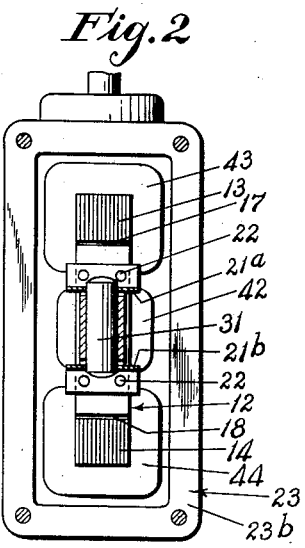
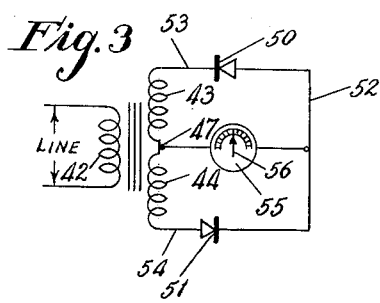
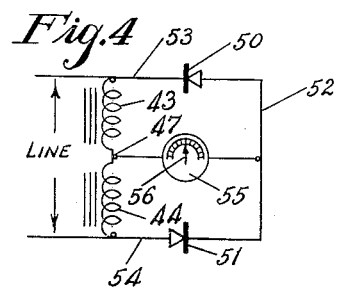
INVENTOR,
RICARDO MESTAS
By
HARRIS, KIECH, FOSTER & HARRIS
FOR THE FIRM
ATTORNEYS.

Patented Mar. 7, 1950

2,499,665

UNITED STATES PATENT OFFICE 2,499,665

ELECTRIC GAUGE HEAD

Ricardo Mestas, Los Angeles, Calif., assignor to Kobe, Inc., Huntington Park, Calif., a corporation of California Original application August 3, 1940, Serial No. 350,939. Divided and this application February 16, 1946, Serial No. 648,127

15 Claims. (Cl. 171—119)

My invention relates to an electric gauging or measuring device of the comparator type by which displacements can be indicated accurately and which is particularly adapted to the accurate gauging of various specimens or various sections of the same specimen. More particularly, the invention is concerned with a measuring device of extreme accuracy within predetermined limits, and which is capable of giving at a remote point a motion, displacement, or indication proportional to the displacement of an element of a gauge head or control unit. The term "linear" is hereinafter used with reference to such proportionality with respect to displacement.

In general, it is an object of the present invention to provide a novel comparator or gauge which is extremely accurate and of simple construction, and in which the readings obtained are substantially unaffected by changes in the applied potential.

The invention has among its objects the provision of a novel control unit including a magnetic circuit with a variable air gap and a winding disposed adjacent the core of the magnetic circuit whereby the potential across the winding varies in response to changes in the air gap, this potential being usable for accurate detection of small changes in size of the gap.

Another object of the invention is to provide a gauge head including an armature mounted in a novel manner which is both simple and substantially frictionless, this armature being moved in response to the measurement to be taken.

It is another object of the invention to provide a simple and reliable circuit adapted for connection to a gauge head in which the reluctance of the flux path is changed in response to the measurement to be taken.

A further object of the invention is to provide such a circuit adapted for connection to a linearly-calibrated meter and which indicates both positive and negative deviations from the desired value at which the comparator is set.

Further objects and advantages of the invention will be made evident hereinafter.

In the drawing, one embodiment of the control unit or gauge head is shown, together with two circuits usable therewith, without intention of limiting the invention thereto.

Referring to the drawing:

Fig. 1 is a diagrammatic view in vertical cross section of the gauge head of the invention;

Fig. 2 is a vertical sectional view, taken on the line 2—2 of Fig. 1;

Fig. 3 is a simplified wiring diagram indicating a circuit well adapted for use with the gauge head of Fig. 1; and Fig. 4 indicates an alternative circuit usable with the gauge head of Fig. 1.

Referring particularly to Fig. 1, the gauge head of the invention includes a core 11 and an armature 12 defining a magnetic circuit.

The core 11 is of general E shape, being formed by a plurality of E-shaped laminations suitably held together or being constructed of a suitable solid material or of powdered magnetic material bound together by non-magnetic dielectric material as is known in the art. As shown, it includes end legs 13 and 14 and a central leg 15 which is shorter than the end legs to provide a space for the armature 12.

The armature 12 is disposed in this space and is formed of suitable magnetic material. This armature is of a length less than the dimension between the end legs 13 and 14 so as to provide air gaps 17 and 18. Likewise, the armature 12 is so mounted as to provide an air gap 19 between the armature and the central leg 15, this air gap being narrow compared to the end gaps 17 and 18 and being of constant size except for the infinitesimal and negligible change when the armature moves bodily through a locus of motion determined by the attachment means to be presently described.

It is the general purpose of the device of the invention to move the armature 12 substantially longitudinally and substantially as indicated by the double-headed arrow 20 in response to the measurement to be taken. It will be clear that movement of the armature in one direction will decrease the gap 17 and simultaneously increase the gap 18, thus decreasing the reluctance of the flux path formed between the central leg 15 and the end leg 13, while increasing the reluctance of the flux path between the central leg 15 and the end leg 14. The reluctance of these flux paths will be oppositely changed when the armature is moved in the opposite direction.

A suitable attachment means 21 is provided for moving the armature 12 in the direction of the double-headed arrow 20. This attachment means may well comprise a parallel-motion device and should be of such nature as to maintain the armature 12 in constant alignment with the ends of the legs 13 and 14 and maintain the faces of all of the air gaps parallel, while at the same time controlling the motion so as to maintain the gap 19 of substantially constant dimension.

The attachment means 21 shown in Fig. 1 has been found particularly advantageous in this respect, and includes a U-shaped member formed of spring material, such as Phosphor bronze, spring brass, or similar material, preferably non-magnetic. It includes arms 21a and 21b bent forward from a base 21c, the forward ends of the arms 21a and 21b being bent outward to form flanges attachable to the armature 12, as by screws or rivets 22. The entire attachment member can be bent from a very thin strip of ribbon-like material and should have sufficient resiliency to permit displacement of the armature 12. This attachment means, a parallel-motion device for movement of the armature 12 as indicated by the double-headed arrow 20, will cause flexure of the attachment member predominantly at the bent sections thereof, which sections, in effect, serve as frictionless pivots of a parallelogram-type attachment. In this way, the armature 12 is guided to move in substantially its own longitudinal plane substantially parallel to the end of the central leg 15. Correspondingly, there is no friction between the armature and this central leg and the small air gap 19 therebetween remains of substantially constant width within the small limits of motion contemplated in the direction of the arrow 20. At the same time, the armature 12 is mounted in a substantially frictionless manner and a very slight degree of movement imparted to the attachment means 21 will move the armature 12 correspondingly without the necessity of overcoming static friction such as would be occasioned by the use of bearings determining the locus of motion of the armature 12.

The control unit is shown diagrammatically as being enclosed in a housing 23 formed of elements 23a and 23b detachably connected together. The E-shaped core 11 is suitably secured to an internal wall of the element 23b. The base 21c of the attachment means 21 may be rigidly connected to an opposite wall of the element 23a providing a depression in which the base 21c is retained by a clamping element 24 receiving a screw 25 passing through a removable section 26 of the housing element 23a.

Removably mounted in the lower portion of the housing element 23a is a sleeve 26 internally threaded to receive a tubular stop member 27 so that, by turning this stop member, the vertical position of the upper annular edge of the stop member can be changed. This upper annular edge serves as a stop means limiting the lowermost position of a head member 28a of a plunger 28 slidable with respect to the stop member 27 and extending downward to provide a tapered portion providing a contact surface 28b adapted to engage an article 29 resting on a base 30.

The upper end of the head member 28a is rounded to engage the correspondingly-rounded lower end of an operating pin 31 operatively connected to the armature 12. This connection is preferably formed by a block 32, preferably of non-magnetic material, connected to the armature within the space between the arms 21a and 21b of the attachment member, the block providing a bore into which the operating pin 31 is pressed to cause this pin and the block 32 to move as a unit. The arms 21a and 21b provide openings through which the pin 31 passes.

To force the operating pin 31 into resilient engagement with the head member 28a, a spring-actuated follower 33 moves in a sleeve 34 attached to the upper end of the housing element 23a. A spring 35 is compressed between the top of this follower and a spring-adjusting member 35a threaded into the sleeve 34. The engaging surfaces of the follower 33 and the operating pin 31 are preferably rounded, as shown.

The device is commonly used as a comparator for detecting and measuring small variations in size between different articles 29. To this end, the device may be calibrated while an article 29 of known dimension is between the contact surface 28b and the base 30. At this time, the housing 23 is moved up or down with respect to the base 30, by means not shown but well known in the art, until the armature 12 is substantially centered between the end legs 13 and 14 or until a balance or zero deflection or deflection to some predetermined point on the scale is obtained on the indicating means to be later described. The tubular stop member 27 should be adjusted to be a slight distance below the head member 28a of the plunger 28, but this adjustment should be such as to stop the downward motion of the armature 12 before the air gap 18 closes when the article 29 is removed. If, then, articles 29 are moved in sequence into the space between the contact surface 28b and the base 30, or if the article is moved along this space or the gauge head 10 moved relative to the article, the armature will move with the plunger 28 and will increase one of the air gaps 17 and 18 and decrease the other correspondingly, thus proportionally decreasing the reluctance of the magnetic circuit completed through the armature and one of the end legs, while proportionally increasing the reluctance of the magnetic circuit through the armature and the other of the end legs, the central leg 15 being common to the two magnetic circuits. By using these changes in reluctance, it is possible to indicate accurately extremely small deviations in the distance between the contact surface 28b and the base 30.

Acting in this regard, the embodiment of Fig. 1 includes a primary winding 42 for sending flux through upper and lower flux paths including the end legs 13 and 14. Similarly, windings 43 and 44 are shown around the end legs 13 and 14. Correspondingly, if the winding 42 is energized from a source of constant-frequency alternating potential (for example, of commercial frequency or of higher-than-commercial frequency), the flux linkages will induce in the windings 43 and 44 potentials which will vary one with respect to the other as the armature 12 is moved. It will be clear that, as the armature 12 shifts upward, for example, the inductive coupling between the windings 42 and 43 increases while that between the windings 42 and 44 decreases. In the preferred embodiment, with the armature in its central position as shown, the potentials induced in the windings 43 and 44 will be equal as these windings are preferably identical, particularly when the control unit is connected in the circuit shown in Fig. 3. The flux densities in the magnetic circuit are kept low to work on the straight portion of the saturation curve and avoid errors such as would be present if saturation was approached.

Referring particularly to Fig. 3, the windings 43 and 44 are connected in series in additive relationship by a connection 47. Similarly, two rectifiers 50 and 51 are connected in series circuit, anode to cathode, by a connection 52. The series-connected rectifiers are connected by conductors 53 and 54 across the series-connected windings 43 and 44. A potential-responsive means, comprising a galvanometer 55 in the preferred embodiment, is connected between the connections 47 and 52. The impedances of the rectifiers 50 and 51 are preferably equal but should at least have the same ratio with respect to each other as the ratio of potentials of the windings 43 and 44 if not designed to be equal.

With equal potentials induced in the windings 43 and 44, current will flow on alternate half-cycles through the rectifiers, and, as the system is then balanced, there will be no potential across the galvanometer 55. If the armature 12 shifts to increase the potential induced in the winding 43 and decrease the potential induced in the winding 44, the system will become unbalanced and a potential difference will be developed across the galvanometer 55, causing the pointer 56 thereof to deflect in a given direction. In like manner, if the armature 12 shifts to increase the induced potential in the winding 44 and decrease the potential in the winding 43, the pointer 56 will move in an opposite direction. In either instance, the shift of the pointer 56 will be substantially proportional to the movement of the contact surface 28b upward or downward from the centralized position shown in Fig. 1. Consequently, by moving the housing 23 up and down when an article 29 of known dimension is in the position shown, the system can be brought to a point of balance, at which the pointer 56 lies opposite a zero indication at the center of the scale of the galvanometer. Articles 29 subsequently moved into the position shown in Fig. 1 may be accurately compared with the standard and a direct indication of deviations from the standard obtained by noting the deflection of the pointer 56 moving above a properly calibrated linear scale.

By use of this circuit, it is possible to use an electric zero center galvanometer 55 and to obtain linear deflections of the pointer 56, i. e., deflections which vary linearly with the motion of the plunger 28. In addition, the indication will be directional, indicating whether the deviations in dimension are positive or negative for, if the article compared is slightly larger in size than the standard, the pointer 56 will move in one direction from the zero point while, if the article is smaller than the standard, the movement of the pointer will be in the opposite direction from the zero point. In either instance, the deviations will be proportional to the movement of the plunger 28 from the standardized position.

Instead of employing a separate primary winding, such as shown in Figs. 1 and 2, the device can be connected as shown in Fig. 4, in which the windings 43 and 44 are connected in series directly across the incoming line representing the source of alternating potential. Movement of the armature 12 will thus increase the potential across one of the windings while decreasing the potential across the other, the sum of the potentials remaining constant. This is accomplished by changing the relative reluctances of the flux paths, and thus the impedance of the windings 43 and 44. Aside from this, the circuit shown in Fig. 4 is identical with that shown in Fig. 3 and corresponding numbers have been applied.

It will be apparent that, in each of the embodiments of the invention, an overall change in voltage of the supply line will not unbalance the zero reading of the system. For example, in Fig. 3 a reduction in line voltage will reduce uniformly the potentials across the windings 43 and 44. This will reduce the current flowing on alternating half cycles through the rectifiers 50 and 51, but the potential across the galvanometer 55 will not materially be varied. The same is true if the windings 43 and 44 are connected across the line, as in Fig. 4. This is an important advantage, particularly as such devices are commonly used on electrical circuits subject to transient changes in potential as, for example, when additional electric motors are thrown on the line, thus reducing temporarily the voltage thereof until the motor comes up to speed.

It will be further apparent that it is within the contemplation of the invention to move the attachment means 21 in response to various means. Movement or displacement can be effected by means moving in response to changes other than dimension. Also, it will be apparent that modifications can be made in the magnetic circuit without departing from the spirit of the invention.

Commonly, the indicating means comprising the meter is disposed in spaced relationship with respect to the gauge head and, if a remote indication is desired, all of the equipment other than the winding or windings used in the gauge head can be positioned at the remote point.

Various changes and modifications can be made without departing from the spirit of the invention as defined in the appended claims.

This application is a division of my application, Serial No. 350,939, filed August 3, 1940, which issued as Patent No. 2,408,524, on October 1, 1946.

I claim as my invention:

1. In combination in an electric gauge head: a magnetic circuit including a core having a long leg and a short leg respectively providing faces disposed at an angle relative to each other, said magnetic circuit also including an armature providing faces spaced respectively from but substantially parallel to and paired with said faces of said legs of said core to define a pair of air gaps; parallel-motion means for mounting said armature to move bodily in a direction substantially parallel to one pair of faces to maintain substantially constant in width that one of the air gaps therebetween and in a manner to change the distance across the other of said air gaps whereby the reluctance of said one of said air gaps remains substantially constant and the reluctance of the other of said air gaps varies in response to displacements of said armature, said parallel-motion means including two movable arms, base means for mounting one end of each of said arms in spaced relation, and means for attaching the other ends of said arms to said armature in similarly spaced relation, said arms remaining substantially parallel during said movement of said armature; and a winding linked with said magnetic circuit.

2. In combination in an electric gauge head: a magnetic circuit including a core having a long leg and a short leg respectively providing faces disposed at an angle relative to each other, said magnetic circuit including also an armature providing faces spaced respectively from but substantially parallel to and paired with said faces of said legs of said core to define a pair of air gaps; means for mounting said armature to move bodily in a direction substantially parallel to one pair of faces to maintain substantially constant in width that one of the air gaps therebetween and in a manner to change the distance across the other of said air gaps whereby the reluctance of said one of said air gaps remains substantially constant and the reluctance of the other of said air gaps varies in response to displacements of said armature, said means including spring means for controlling the locus of motion of said armature; and a winding linked with said magnetic circuit.

3. In combination in an electric gauge head: a magnetic circuit including a core having a long leg and a short leg respectively providing faces disposed at an angle relative to each other, said magnetic circuit including also an armature providing faces spaced respectively from but substantially parallel to and paired with said faces of said legs of said core to define a pair of air gaps; means for mounting said armature to move bodily in a direction substantially parallel to one pair of faces to maintain substantially constant in width that one of the air gaps therebetween and in a manner to change the distance across the other of said air gaps whereby the reluctance of said one of said air gaps remains substantially constant and the reluctance of the other of said air gaps varies in response to displacements of said armature, said means including a spring means for supporting and guiding said armatures in its movement and means for connecting one end of said spring means to said armature and for retaining stationary the other end of said spring means; and a winding linked with said magnetic circuit.

4. A combination as defined in claim 3, including a member movable with said armature, means engaging said member to control the position of said armature, and resilient follower means for holding said member and said means in resilient engagement.

5. In combination in an electric gauge head: a core providing two end legs and a central leg disposed in a common plane; an armature completing flux paths from said central leg to said end legs; parallel-motion means for movably mounting said armature for bodily motion in said plane in substantially constant spaced relationship with said central leg whereby the air gap formed between said armature and said central leg remains substantially constant with change in position of said armature, said armature extending to a position adjacent said end legs whereby movement of said armature in one direction increases the reluctance of the flux path through one end leg and decreases the reluctance of the flux path through the other end leg, said parallel-motion means including two substantially parallel arms formed of spring material, a base means for holding one end of each of said arms in fixed position with said ends spaced a distance from each other, and means for attaching the other ends of said arms to said armature to be spaced from each other substantially the same distance, said arms controlling the direction of movement of said armature; and a pair of windings positioned to be respectively linked by the flux in said two flux paths.

6. A combination as defined in claim 5, including a primary winding around said central leg for sending flux through said two flux paths.

7. In combination in an electric gauge head: an E-shaped core providing a central leg and two end legs disposed in a common plane, said central leg being of lesser length than said end legs and providing an end face, a line joining said end legs lying parallel to said end face; an armature of greater length than width and disposed lengthwise between said end legs and adjacent the end face of said central leg, said armature providing a longitudinal axis extending parallel to said line; and parallel-motion means for mounting said armature for bi-directional bodily motion thereof in said plane and in the direction of its longitudinal axis while substantially constantly spaced from said end face to define a substantially constant-width air gap therebetween and to define oppositely-varying air gaps between said armature and said end legs.

8. In combination in an electric gauge head: a magnetic circuit including a core having a long leg and a short leg respectively providing faces disposed at an angle relative to each other, said magnetic circuit including also an armature providing faces spaced respectively from but substantially parallel to and paired with said faces of said legs of said core to define a pair of air gaps; means for mounting said armature to move bodily in a direction substantially parallel to one pair of faces to maintain substantially constant in width that one of the air gaps therebetween and in a manner to change the distance across the other of said air gaps whereby the reluctance of said one of said air gaps remains substantially constant and the reluctance of the other of said air gaps varies in response to displacements of said armature, said means including a substantially U-shaped spring means including two arms and a base and including means for connecting one end of each of said arms to said armature in spaced relationship with respect to each other and means for retaining said base in fixed position whereby flexure of said U-shaped spring means permits movement of said armature to take place; and a winding linked with said magnetic circuit.

9. In combination in an electric gauge head: an E-shaped core providing a central leg and two end legs disposed in a common plane, said central leg being of lesser length than said end legs and providing an end face; an armature disposed between said end legs and adjacent the end face of said central leg; and means for mounting said armature for bi-directional bodily motion thereof in said plane while substantially constantly spaced from said end face to define a substantially constant width air gap therebetween and to define oppositely-varying air gaps between said armature and said end legs, said mounting means including a resilient means for supporting and determining the locus of motion of said armature, said resilient means including a spring member providing a fixed-position base and two substantially parallel arms extending from said base and attached to said armature at spaced positions, said mounting means permitting movement of said armature through flexure of said arms.

10. In an electrical measuring device responsive to mechanical displacements, an E-shaped magnetic member including a pair of spaced outer legs and an inner leg, an armature member of magnetic material extending between said outer legs, said inner leg being shorter than said outer legs to provide a face adjacent said armature member, said armature member being spaced from said outer legs to provide air gaps therebetween, means mounting said armature member for movement substantially parallel to said face of said inner leg to vary oppositely the air gaps between said armature member and said outer legs, said last-named means comprising a pair of leaf springs connecting said armature member to said magnetic member, a winding on said inner leg for producing, when energized, magnetic fluxes in said outer legs, and a separate winding on each of said outer legs, each of said windings having a voltage induced therein which is dependent on the magnetic flux passing through the associated leg of said magnetic member, said armature member having a contact element associated therewith, whereby displacements of said contact element relative to said magnetic member simultaneously vary oppositely the magnetic reluctances offered to magnetic fluxes passing respectively through said outer legs.

11. In an electrical measuring device responsive to mechanical displacements, a magnetic member, a magnetic armature element, means mounting said armature element for rectilinear motion with respect to said magnetic member in a predetermined direction, said armature element having first and second spaced surfaces disposed angularly with respect to said predetermined direction, and said armature element having a third surface extending substantially parallel to said predetermined direction, said magnetic member having surfaces respectively extending adjacent and substantially parallel to said first, second and third surfaces to define with said armature element a pair of magnetic paths having reluctances which vary oppositely in response to said rectilinear motion of said armature element, a separate electrical winding linked with each of said magnetic paths, and a winding effective, when energized, for producing magnetic flux in both of said paths, said last-named winding linking both of said magnetic paths.

12. In an electrical measuring device responsive to mechanical displacements, a magnetic member, a magnetic armature element, means mounting said armature element for rectilinear motion with respect to said magnetic member in a predetermined direction, said armature element having first and second spaced surfaces disposed angularly with respect to said predetermined direction, and said armature element having a third surface extending substantially parallel to said predetermined direction, said magnetic member comprising a magnetic base portion and first, second and third magnetic legs projecting from said base portion, said magnetic legs having surfaces respectively extending adjacent and substantially parallel to said first, second and third surfaces to define with said armature element a pair of magnetic paths having reluctances which vary oppositely in response to said rectilinear motion of said armature element, a separate electrical winding linked with each of said magnetic paths, and a third electrical winding surrounding said third magnetic leg for producing, when energized, magnetic flux in both of said magnetic paths.

13. In combination in an electric gauge head: an E-shaped core providing a central leg and two end legs disposed in a common plane, said central leg being of lesser length than said end legs and providing an end face, a line joining said end legs lying parallel to said end face; an armature disposed between said end legs and adjacent the end face of said central leg, said armature providing a longitudinal axis extending parallel to said line; and parallel-motion means for mounting said armature for bi-directional bodily motion thereof in said plane and in the direction of its longitudinal axis while substantially constantly spaced from said end face to define a substantially constant-width air gap therebetween and to define oppositely-varying air gaps between said armature and said end legs, said parallel-motion means comprising a pair of substantially parallel arms formed of spring material and means for connecting one end of each of said arms to said armature at positions spaced from each other in the direction of said longitudinal axis.

14. In combination in an electric gauge head: an E-shaped core providing a central leg and two end legs disposed in a common plane, said central leg being of lesser length than said end legs and providing an end face, a line joining said end legs lying parallel to said end face; an armature disposed between said end legs and adjacent the end face of said central leg, said armature providing a longitudinal axis extending parallel to said line; parallel-motion means for mounting said armature for bi-directional bodily motion thereof in said plane and in the direction of its longitudinal axis while substantially constantly spaced from said end face to define a substantially constant-width air gap therebetween and to define oppositely-varying air gaps between said armature and said end legs; a member attached to said armature; a movable plunger in mechanically-operative relationship with said member, said plunger being adapted to engage an article to be gauged; and means for resiliently urging said member and said movable plunger into engagement to cause said armature to follow said plunger.

15. In combination in an electric gauge head: an E-shaped core providing a central leg and two end legs disposed in a common plane, said central leg being of lesser length than said end legs and providing an end face, a line joining said end legs lying parallel to said end face; an armature disposed between said end legs and adjacent the end face of said central leg, said armature providing a longitudinal axis extending parallel to said line; parallel-motion means for mounting said armature for bi-directional bodily motion thereof in said plane and in the direction of its longitudinal axis while substantially constantly spaced from said end face to define a substantially constant-width air gap therebetween and to define oppositely-varying air gaps between said armature and said end legs; a plunger operatively connected to said armature; means for limiting the motion of said plunger to limit the motion of said armature; and means for varying the position of said limiting means.

RICARDO MESTAS.

REFERENCES CITED

The following references are of record in the file of this patent:

UNITED STATES PATENTS

| Number | Name | Date |
|---|---|---|
| 2,137,068 | Valentine et al. | Nov. 15, 1938 |
| 2,230,945 | Hansell | Feb. 4, 1941 |
| 2,231,702 | Burgwin et al. | Feb. 11, 1941 |
| 2,240,184 | Hathaway | Apr. 29, 1941 |
| 2,268,956 | Mestas | Jan. 6, 1942 |
| 2,365,593 | Rights et al. | Dec. 19, 1944 |
| 2,370,073 | Reason | Feb. 20, 1945 |

FOREIGN PATENTS

| Number | Country | Date |
|---|---|---|
| 709,923 | France | May 26, 1931 |